United States Patent
Walls et al.

(10) Patent No.: US 11,151,746 B2
(45) Date of Patent: Oct. 19, 2021

(54) IMAGE PROCESSING DEVICES THAT UTILIZE BUILT-IN DYNAMIC CAMERA MODELS TO SUPPORT RAPID DETERMINATION OF CAMERA INTRINSICS AND METHODS OF OPERATING SAME

(71) Applicant: SONY GROUP CORPORATION, Tokyo (JP)

(72) Inventors: Mattias Walls, Häljarp (SE); Francesco Michielin, Stuttgart (DE); Fredrik Olofsson, Lund (SE); Fredrik Mattisson, Lund (SE)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 16/630,632

(22) PCT Filed: Aug. 31, 2017

(86) PCT No.: PCT/US2017/049566
§ 371 (c)(1),
(2) Date: Jan. 13, 2020

(87) PCT Pub. No.: WO2019/045721
PCT Pub. Date: Mar. 7, 2019

(65) Prior Publication Data
US 2020/0167960 A1 May 28, 2020

(51) Int. Cl.
*G06T 7/80* (2017.01)
*H04M 1/02* (2006.01)
(Continued)

(52) U.S. Cl.
CPC ............. *G06T 7/80* (2017.01); *H04M 1/0264* (2013.01); *H04N 5/232* (2013.01); *H04N 5/2253* (2013.01)

(58) Field of Classification Search
CPC ........... G06T 7/80; G06T 2207/30208; H04M 1/0264; H04N 5/232; H04N 5/2253; H04N 17/002
See application file for complete search history.

(56) References Cited

U.S. PATENT DOCUMENTS

| | | | |
|---|---|---|---|
| 2017/0134620 A1* | 5/2017 | Stern | H04N 5/23212 |
| 2020/0021727 A1* | 1/2020 | Ikeda | G01B 11/26 |

FOREIGN PATENT DOCUMENTS

WO 2019/040068 A1 2/2019

OTHER PUBLICATIONS

Huang et al. "Dynamic camera calibration" Proceedings of International Symposium on Computer Vision—ISCV (pp. 169-174) (Nov. 21-23, 1995).

(Continued)

*Primary Examiner* — Mekonnen D Dagnew
(74) *Attorney, Agent, or Firm* — Myers Bigel, P.A.

(57) ABSTRACT

Image processing devices and methods according to embodiments of the invention advantageously utilize computationally efficient and high speed operations based on dynamic camera models to support rapid determination of multiple camera intrinsics. These built-in dynamic models can utilize varying focus distance values as inputs (i.e., operands) to generate respective intrinsic parameters as outputs, as a stream of images are captured and processed in real time to possibly determine pose and position of a three-dimensional (3D) object during 3 image scanning.

11 Claims, 11 Drawing Sheets

(51) Int. Cl.
*H04N 5/232* (2006.01)
*H04N 5/225* (2006.01)

(56) References Cited

OTHER PUBLICATIONS

Li et al. "Some aspects of zoom lens camera calibration" IEEE Transactions on Pattern Analysis and Machine Intelligence 18(11):1105-1110 (Nov. 1996).
Sanz-Ablanedo et al. "Parameterising Internal Camera Geometry with Focusing Distance" The Programmetric Record 27(138):210-226 (Jun. 2012).
Sarkis et al. "A Novel Technique to Model the Variation of the Intrinsic Parameters of an Automatic Zoom Camera using Adaptive Delaunay Meshes Over Moving Least-Squares Surfaces" 2007 IEEE International Conference on Image Processing (pp. 425-428) (Sep. 2007).
Willson, Reg. G "Modeling and Calibration of automated zoom lenses" Ph.D. Dissertation, Carnegie Mellon University (189 pages) (Jan. 1994).
Notification of Transmittal of the International Search Report and the Written Opinion of the International Searching Authority, or the Declaration, in corresponding PCT Application No. PCT/US2017/049566 (dated Feb. 16, 2018).

\* cited by examiner

IMAGE PROCESSING DEVICES THAT UTILIZE BUILT-IN DYNAMIC CAMERA MODELS TO SUPPORT RAPID DETERMINATION OF CAMERA INTRINSICS AND METHODS OF OPERATING SAME

CROSS REFERENCE TO RELATED APPLICATION

This application is a 35 U.S.C. § 371 national stage application of PCT International Application No. PCT/US2017/049566, filed on Aug. 31, 2017, the content of which is incorporated herein by reference in its entirety. The above-referenced PCT International Application was published in the English language as International Publication No. WO 2019/045721 A1 on Mar. 7, 2019.

FIELD OF THE INVENTION

The present invention relates to image capture and processing devices and, more particularly, to image capture and processing devices that support pose and position determinations from images of three-dimensional (3D) objects and methods of operating same.

BACKGROUND

When calculating pose and position of a 3D object from a series of images of the object, one or more intrinsics of an image capture device (e.g., camera) are typically used as inputs to the pose and position algorithms. For example, important intrinsics such as lens focal length and radial distortion parameters typically need to be either known a priori or readily deducible quantities. As will be understood by those skilled in the art, whenever the lens focus distance associated with one or more of the series of images changes, the corresponding intrinsics also change, even if the camera is assumed to generally adhere to a pin-hole camera model. This is true even when an image capture device utilizes a fixed focal length lens, because changes in focus distance of a lens often cause a concomitant shift in an angle of view of the lens, which is commonly referred to as "focus breathing." Stated alternatively, even with a fixed focal length lens, a change in the focal plane at which an image is captured by an image sensor will typically cause the captured image to have a somewhat different field of field (i.e., perspective).

Accordingly, any predetermined intrinsics, which may have been derived from a manual calibration of the image capture device, typically become invalid in response to changes in focus distance and thereby render pose and position calculations inaccurate. To preclude these inaccuracies, conventional image-based 3D calculations typically need large amounts of processing and computational power to determine the unique intrinsics for each of a plurality of images (e.g., image frames) or, alternatively, require a static focus distance, which can yield blurry, out-of-focus results. In some cases, it may be possible to reasonably infer one or more camera intrinsics by solving large minimization problems, for example. But, such techniques also typically require large amounts of computing power, which can be incompatible with real-time systems having limited hardware.

SUMMARY OF THE INVENTION

Image processing devices and methods according to embodiments of the invention advantageously utilize computationally efficient and high speed operations based on dynamic camera models to support rapid determination of multiple camera intrinsics. In some cases, these built-in dynamic models can utilize varying focus distance values as inputs (i.e., operands) to generate respective intrinsic parameters as outputs, as one or more images is captured and processed as discrete "photographs," or as a stream of images are processed in real time as video (e.g., 4K video), or to possibly determine pose and position of a three-dimensional (3D) object during 3D image scanning.

According to some of these embodiments on the invention, an image capture and processing device (e.g., digital camera, handheld cellular device, etc.) may: (i) generate a plurality of image frames of an object at respective focus distances relative to the image capture and processing device; and (ii) determine for each of the plurality of image frames, at least one intrinsic characteristic of the image capture and processing device using a model of the image capture and processing device that maps the focus distance of the corresponding image frame to the at least one intrinsic characteristic. In some of these embodiments of the invention, the at least one intrinsic characteristic includes an effective focal length of the digital camera and the effective focal lengths determined for the plurality of image frames may be unequal, even if the image capture and processing device includes a lens having a fixed "nominal" focal length (or a zoom lens set to a fixed focal length). In other embodiments of the invention, the at least one intrinsic characteristic includes at least one of: an effective focal length, a radial distortion (a/k/a magnifying distortion) parameter(s), a tangential distortion (a/k/a skewing distortion) parameter(s) and a principal point parameter.

According to additional embodiments of the invention, an image processing device may be provided, which includes a microprocessor and memory, which has image processing program code therein that is readable by and executable within the microprocessor. This image processing program code includes microprocessor-readable program code configured to cause the image processing device to: (i) generate a plurality of image frames of an object at respective focus distances relative to the image processing device, and (ii) determine, for each of the plurality of image frames, at least one intrinsic characteristic of the image processing device using a model of the image processing device that maps (directly or indirectly) the focus distance of the corresponding image frame to the at least one intrinsic characteristic. Typically, each of the plurality of image frames may be generated when a lens within the image processing device has a fixed "nominal" focal length or is set to nominal focal length. The at least one intrinsic characteristic may include an effective focal length of the lens, and the effective focal lengths determined for at least some of the plurality of image frames may be unequal to the nominal focal length as a result of focus breathing. The at least one intrinsic characteristic may also include a radial distortion parameter(s), a tangential distortion parameter(s) and a principal point parameter.

According to still further embodiments of the invention, an image capture and processing device, such as a digital camera, includes a fixed or zoom lens and an image sensor optically coupled to the lens. A microprocessor is also provided along with at least one memory. This at least one memory includes image processing program code therein that is executable by the microprocessor to determine at least one focus breathing related characteristic of the digital camera that varies across a plurality of image frames of an object, which are stored in the at least one memory.

In still further embodiments of the invention, a handheld cellular device is provided with a body having a digital camera therein with a fixed or variable focal length lens, an image sensor optically coupled to the lens, a microprocessor and at least one memory having image processing program code therein. This image processing code is readable by the microprocessor and executable therein. The microprocessor and the image processing program code are collectively configured to: (i) generate a plurality of image frames of an object at respective focus distances relative to the handheld cellular device, and (ii) determine, for each of the plurality of image frames, at least one intrinsic characteristic of the digital camera using a model of the digital camera that maps the focus distance of the corresponding image frame (directly or indirectly) to the at least one intrinsic characteristic. Moreover, in the event each of the plurality of image frames is generated when the lens is set to (or fixed at) a nominal focal length and the at least one intrinsic characteristics is an effective focal length of the lens, then the effective focal lengths determined for at least some of the plurality of image frames may be unequal to the nominal focal length. In addition, the model of the digital camera may be stored in memory within the handheld cellular device so that operations to determine the at least one intrinsic characteristic can be performed in real time as the plurality of image frames are generated either during 3D scanning, video or discrete image capture, for example.

Additional embodiments of the invention may also include methods of calibrating a digital camera by: (i) determining a focus breathing attribute associated with each of a plurality of images of a fixed pattern, which were captured at a corresponding plurality of unequal focus distances by the digital camera disposed at a fixed distance relative to the fixed pattern, and then (ii) generating, from the focus breathing attributes associated with the plurality of images of the fixed pattern, a model of the digital camera that maps focus distance of the digital camera to at least one intrinsic characteristic of the digital camera.

According to these embodiments of the invention, the operations to generate a model of the digital camera may include generating a first model that maps focus distance associated with the plurality of images of the fixed pattern (e.g., checkerboard pattern) to an effective focal length of the digital camera. This first model may take the form of a first linear relationship as: $y_1 = m_1 x_1 + b_1$, where $y_1$ designates the effective focal length, $x_1$ designates the focus distance, $m_1$ designates a slope of the first linear relationship and $b_1$ is a first constant. The operations to generate a model of the digital camera may further include generating a second model that maps the effective focal length to a distortion parameter of the digital camera, which may be a radial distortion parameter, a tangential distortion parameter and a principal point parameter, for example. This second model may take the form of a second linear relationship as: $y_2 = m_2 y_1 + b_2$, where $y_2$ designates the distortion parameter, $y_1$ designates the effective focal length, $m_2$ designates a slope of the second linear relationship and $b_2$ is a second constant. Alternatively, the first and second models may demonstrate one or more nonlinear relationships between focus distance, effective focal length and a distortion parameter(s).

The operations to determine a focus breathing attribute may also include operations to determine distortion parameters for each of the plurality of images of the fixed pattern, and then undistort each of the plurality of images of the fixed pattern to reduce distortion therein.

DETAILED DESCRIPTION OF EMBODIMENTS

Figure 1A:
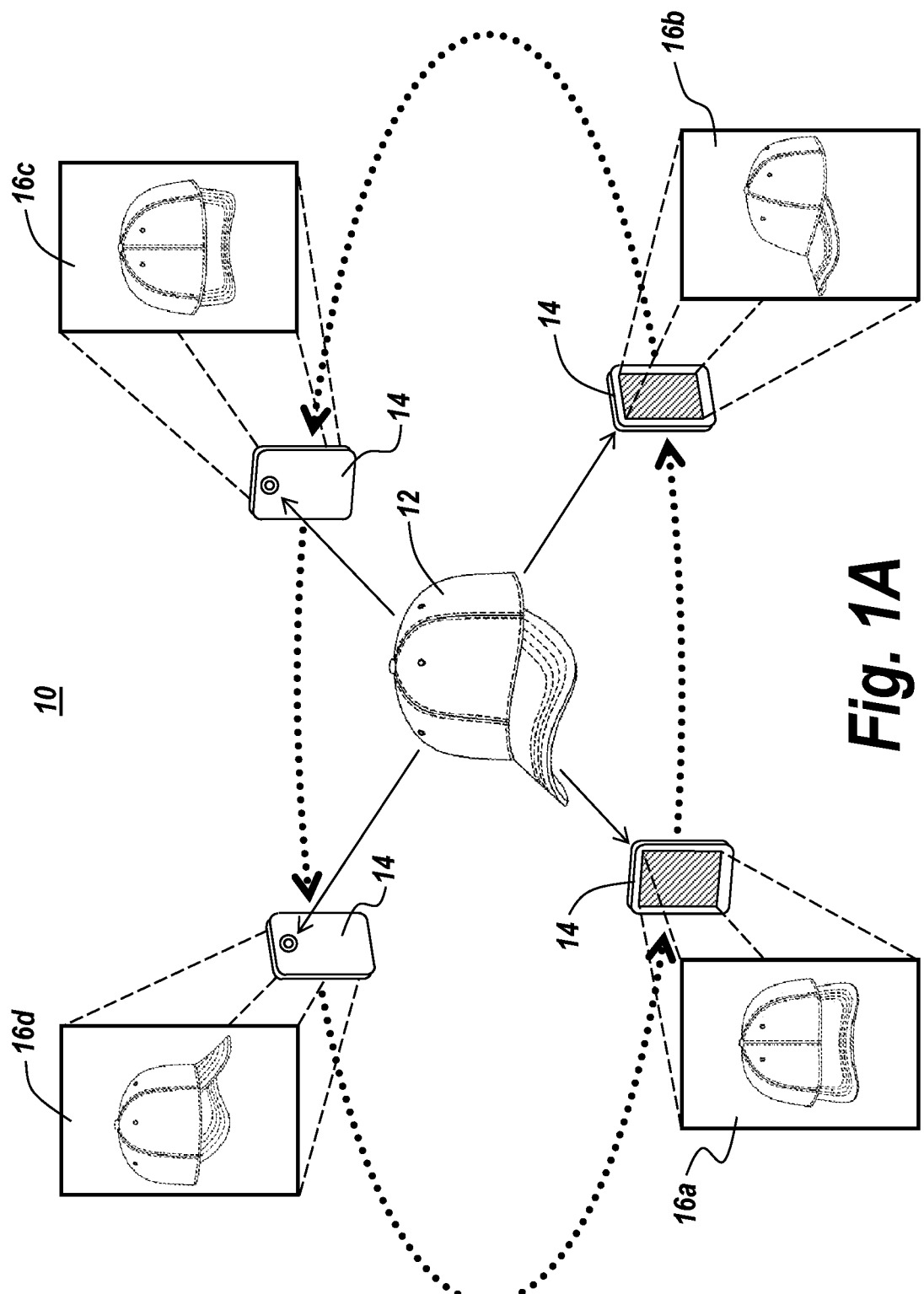
FIG. 1A is a perspective view of a three-dimensional (3D) object undergoing a 3600 scan to determine, among other things, pose and position of the 3D object, according to some embodiments of the present invention.

The present invention now will be described more fully with reference to the accompanying drawings, in which preferred embodiments of the invention are shown. This invention may, however, be embodied in many different forms and should not be construed as being limited to the embodiments set forth herein; rather, these embodiments are provided so that this disclosure will be thorough and complete, and will fully convey the scope of the invention to those skilled in the art. Like reference numerals refer to like elements throughout.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the present invention. As used herein, the singular forms "a," "an" and "the" are intended to include the plural forms as well, unless the context clearly indicates otherwise. It will be further understood that the terms "comprising", "including", "having" and variants thereof, when used in this specification, specify the presence of stated features, steps, operations, elements, and/or components, but do not preclude the presence or addition of one or more other features, steps, operations, elements, components, and/or groups thereof. In contrast, the term "consisting of" when used in this specification, specifies the stated features, steps, operations, elements, and/or components, and precludes additional features, steps, operations, elements and/or components.

Example embodiments are described herein with reference to block diagrams and/or flowchart illustrations of computer-implemented and computer-assisted methods, apparatus (systems and/or devices) and/or computer program products. It is understood that any block within the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions, which implement the functions/acts specified in the block diagrams and/or flowchart block or blocks.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Referring now to FIG. 1A, operations to perform a 360° image scan 10 of a three-dimensional (3D) object 12 may include utilizing an image capture device 14 to obtain/capture a plurality of images 16a-16d of the object 12 at different points of perspective around the object 12, as shown. Customarily, this scan 10 may include moving the image capture device 14 in a closed-loop around the object 12 at a relatively constant rate, which may be sufficiently slow to preclude excessive image blur, and at a relatively constant focus distance (e.g., radius) or possibly at varying focus distances, which typically may cause a concomitant change in an effective focal length (e.g., magnification, etc.) of a multi-element lens through which the images are captured by the capture device 14. If necessary, repeated image capture along one or more arcs of the circle may be performed to complete the image scan 10, particularly if any of the captured images (e.g., 16a-16d) are corrupted because of the presence of excessive image blur and deleted, as explained more fully in PCT Application Serial No. PCT/US2017/048343, filed Aug. 24, 2017, the disclosure of which is hereby incorporated herein by reference.

Figure 1B:
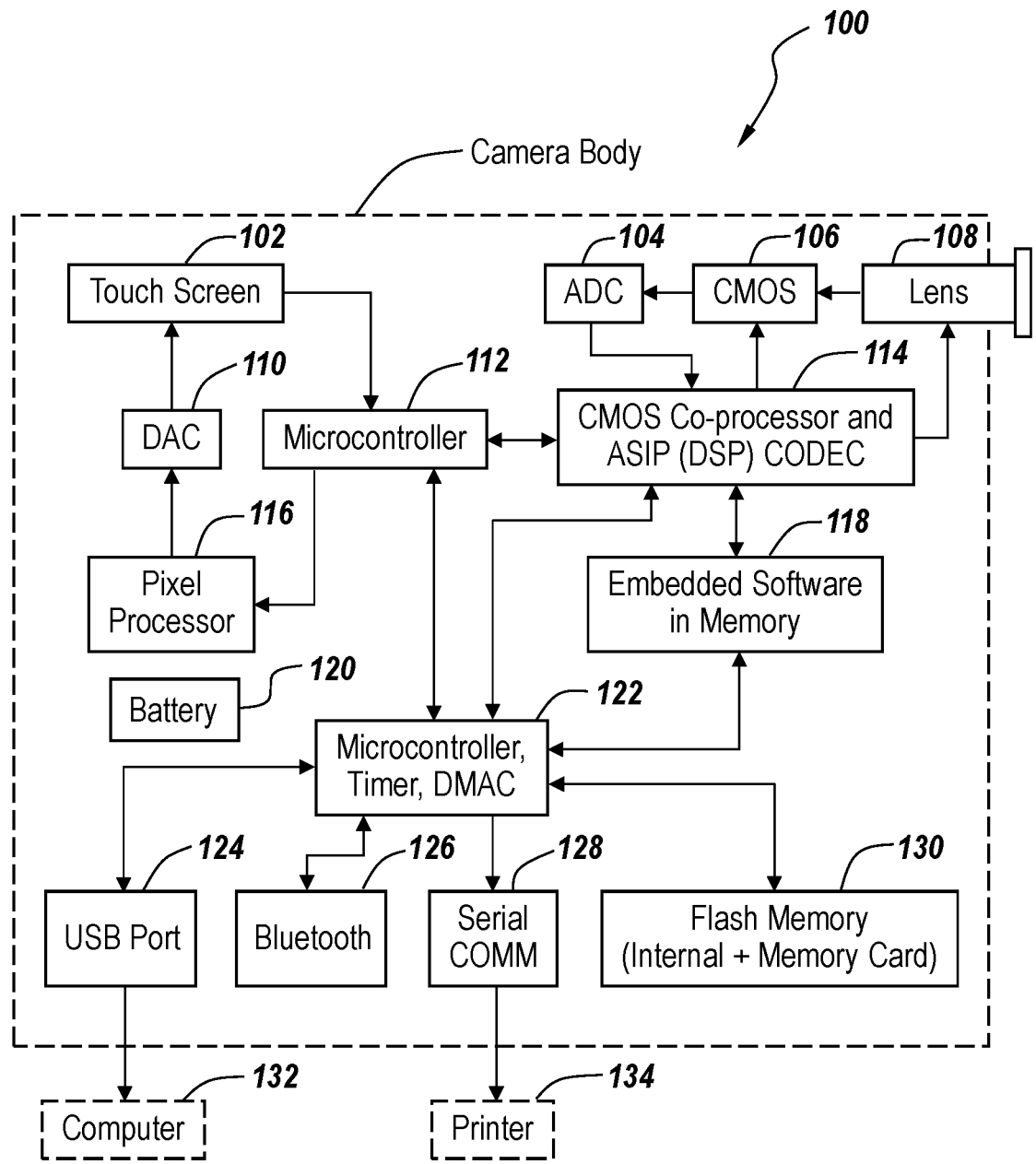
FIG. 1B is a block diagram of an image capture device, which may be used during the 360° image scan illustrated by FIG. 1A and during image processing to determine pose and position of a 3D object, according to some embodiments of the present invention.

As illustrated by FIG. 1B, an embodiment of the image capture device 14 of FIG. 1A, which possesses both image capture capability and substantial post capture image processing capability, is shown as a potentially handheld device containing digital camera components embodied within a camera body. This image capture and image processing device 100, which may be embodied as a handheld cellular device (e.g., smart phone), can include a menu-driven touch screen (with image display) 102, a camera lens 108, memory 118, 130, a battery 120 and various additional processing circuitry, which can communicate with external devices, such as a computer 132 (via a USB port 124 and/or bluetooth port 126) and a printer (via a serial communications port 128 and/or bluetooth port 126). Alternatively, in some embodiments of the invention, the image capture and image processing device 100 may be embodied as a plurality of discrete devices that perform respective image capture and image processing operations, which may be physically and/or temporally spaced apart.

The additional processing circuitry illustrated by FIG. 1B can include a CMOS image sensor 106, which can receive an image of an object developed through the lens 108, and an analog-to-digital converter (ADC) 104, which converts analog image signals developed at the image sensor 106 into digital signals, which are provided to an image co-processor and application-specific instruction set processor (ASIP) 114, which, among other things, performs digital signal processing (DSP) and coder-decoder (CODEC) operations and operates under control of embedded software (including firmware). This software may be provided as microprocessor-readable image capture program code and image processing program code within the memory 118. In addition, microcontrollers 112, 122 with timers and direct memory access control (DMAC) are provided with access to: internal and removable flash memory 130, the image co-processor and ASIP 114, and a touch screen pixel processor 116, which drives the touch screen 102 via a digital-to-analog converter (DAC) 110.

Figure 2A:
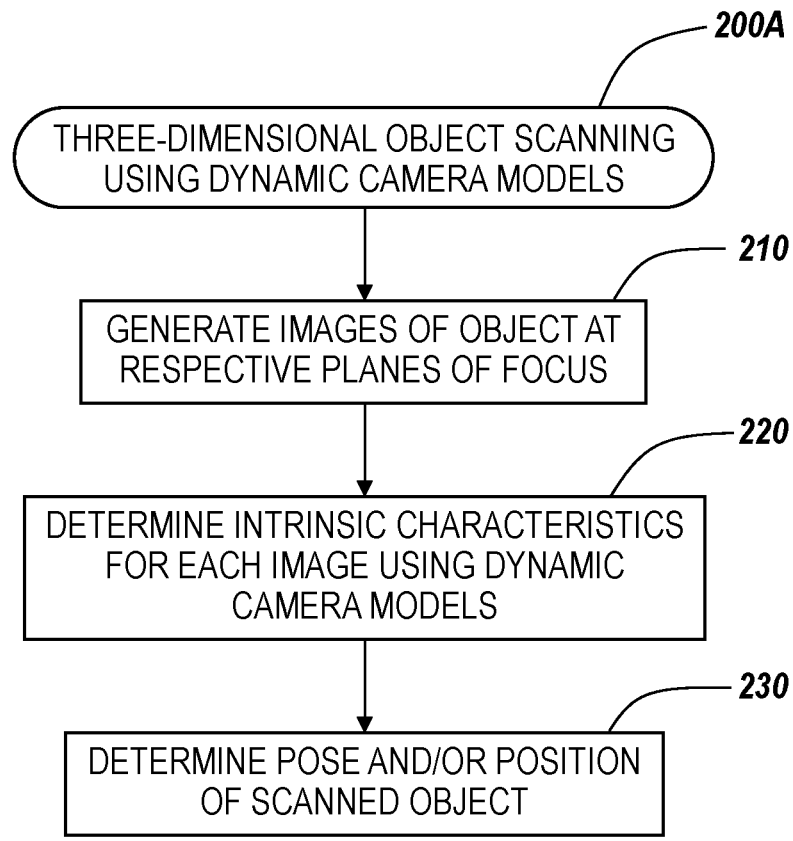
FIG. 2A is a flow diagram of operations that illustrates three-dimensional (3D) object scanning using dynamic camera models, according to some embodiments of the invention.

Referring now to the operations 200A highlighted by the flow diagram of FIG. 2A, the image capture and image processing device 100 of FIG. 1B may utilize the image co-processor and ASIP 114, which operates under control of the image processing program code (within memory 118), to support a three-dimensional (3D) scan of an object or another form of image capture (e.g., video, photographs). In particular, as shown by block 210, during 3D scanning, a plurality of images of an object are captured at respective planes of focus, as consecutively generated image frames (i.e., digital images developed through the lens 108 and onto the CMOS image sensor 106). These image frames may then be processed at high speed using computationally-efficient "dynamic" camera models to thereby determine one or more intrinsic characteristics associated with each of the captured frames. These intrinsics are then used as algorithmic inputs to pose, position and possibly other calculations relevant to real-time 3D scanning, Blocks 220, 230.

Figure 2B:
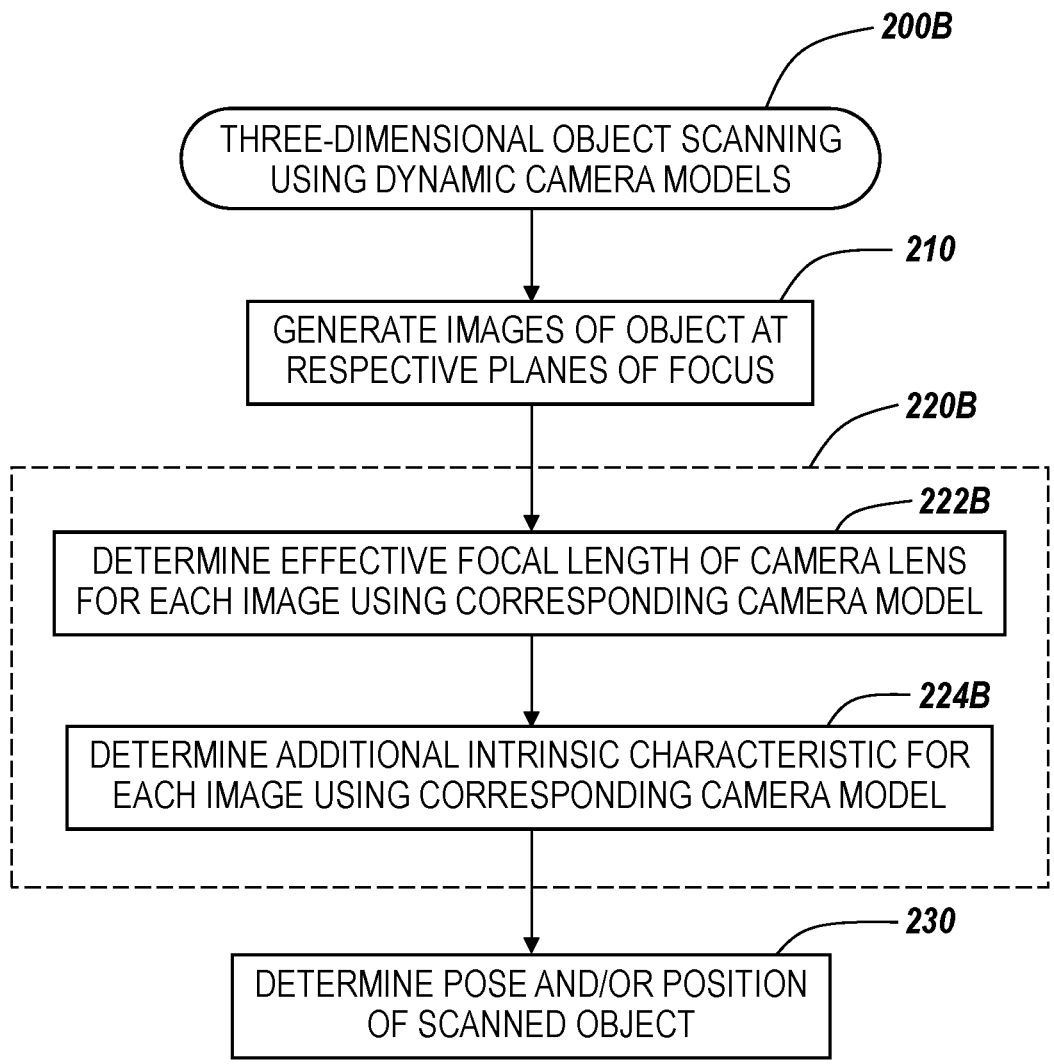
FIG. 2B is a flow diagram of operations that illustrates three-dimensional (3D) object scanning using dynamic camera models, according to some embodiments of the invention.

According to additional embodiments of the invention and as highlighted by the scanning operations 200B of FIG. 2B, the operations to determine intrinsic characteristics, Block 220B, can include determining an effective focal length of the camera lens 108 (fixed or zoom) associated with each of the captured image frames using a first model, Block 222B, and determining at least one additional intrinsic for each of the captured image frames using a corresponding "second" model, Block 224B. As explained more fully hereinbelow with respect to FIGS. 3A-3C and 4A-4C, these unique models may be generated for each image capture and image processing device 100 during respective calibration operations and then downloaded into the memory 118.

Figure 2C:
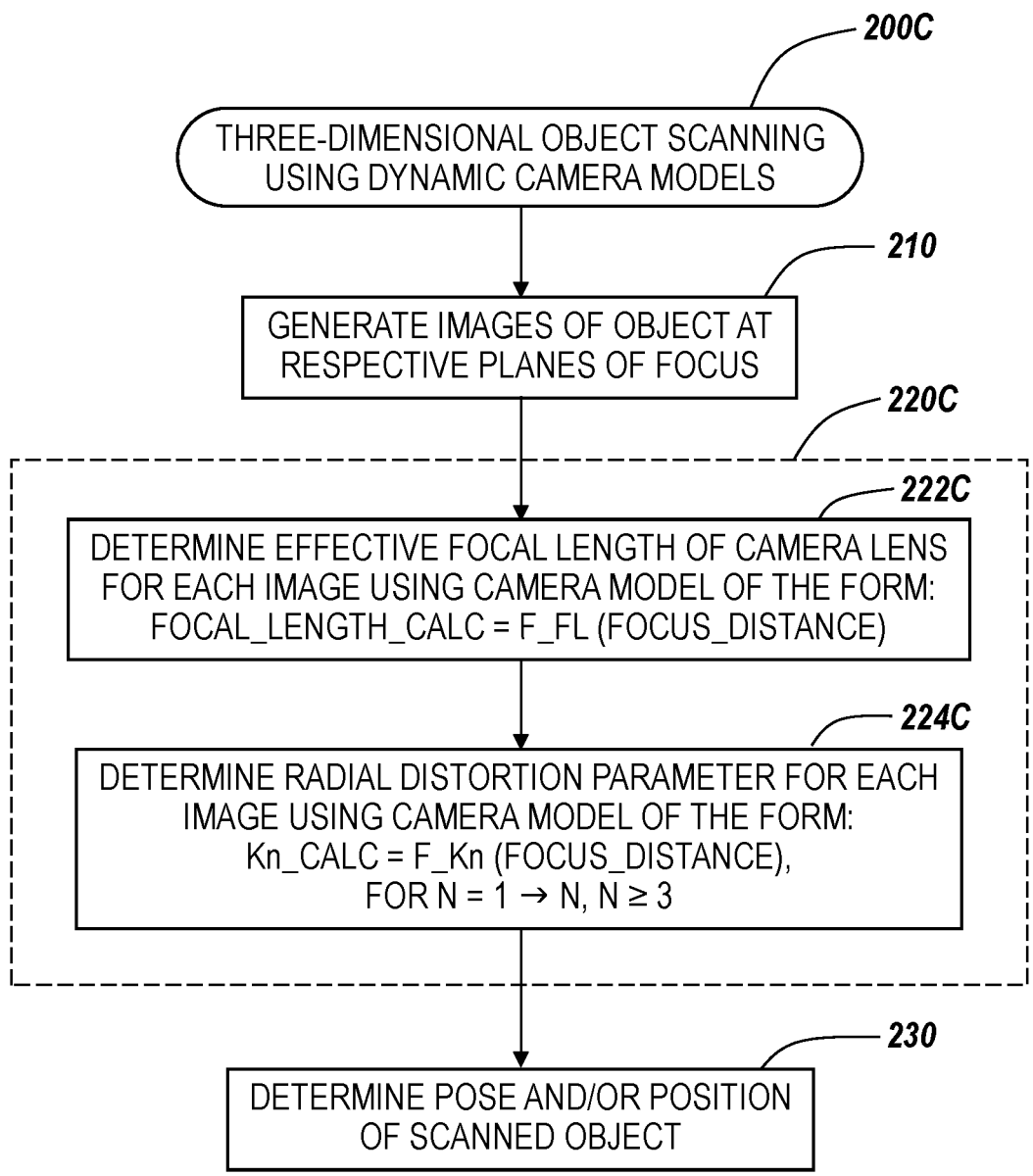
FIG. 2C is a flow diagram of operations that illustrates three-dimensional (3D) object scanning using dynamic camera models, according to some embodiments of the invention.

Next, as shown by the scanning operations 200C of FIG. 2C, the operations to determine intrinsic characteristics, Block 220C, may include determining the first model with the general form y=f(x) and, more specifically, the form: Focal_Length_Calc=F_FL (Focus_Distance), where "Focal_Length_Calc" designates the effective focal length (output), which is generated from an "intrinsic" focal length function (F_FL) having focus distance (Focus_Distance) as an input/operand, Block 222C. In addition, as shown by Block 224C, a further intrinsic, such as a radial distortion parameter, may be determined using a model of the general form y=f(x) and, more specifically, the form: Kn_Calc=F_Kn (Focus_Distance), where F_Kn is a specific function for each multiplier (i.e., K1, K2, . . . , K5).

These dynamic models of a camera's intrinsic characteristics, which can relate directly or indirectly to a focus breathing phenomenon associated with each camera's lens (and possibly sensor skew, etc.), may be generated in response to a manufacturer's calibration operations so that each camera may be initially sold with its unique software-based models therein, or subsequently receive model-specific dynamic models (including updated models) via a distributed firmware update, for example.

Figure 3A:
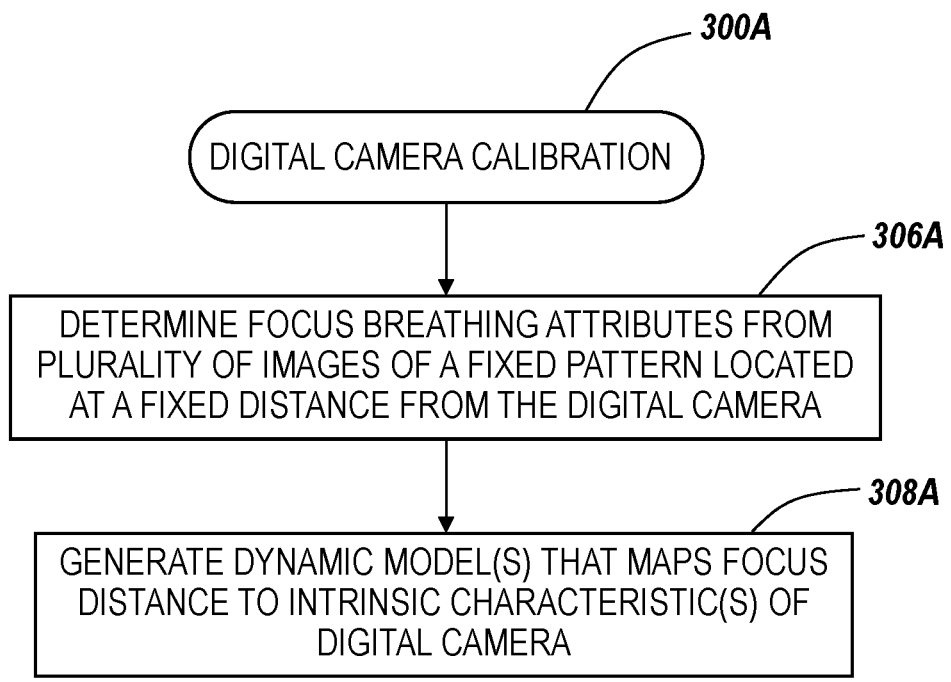
FIG. 3A is a flow diagram of operations that illustrates performing digital camera calibration to generate dynamic camera models, according to some embodiments of the invention.
Figure 3B:
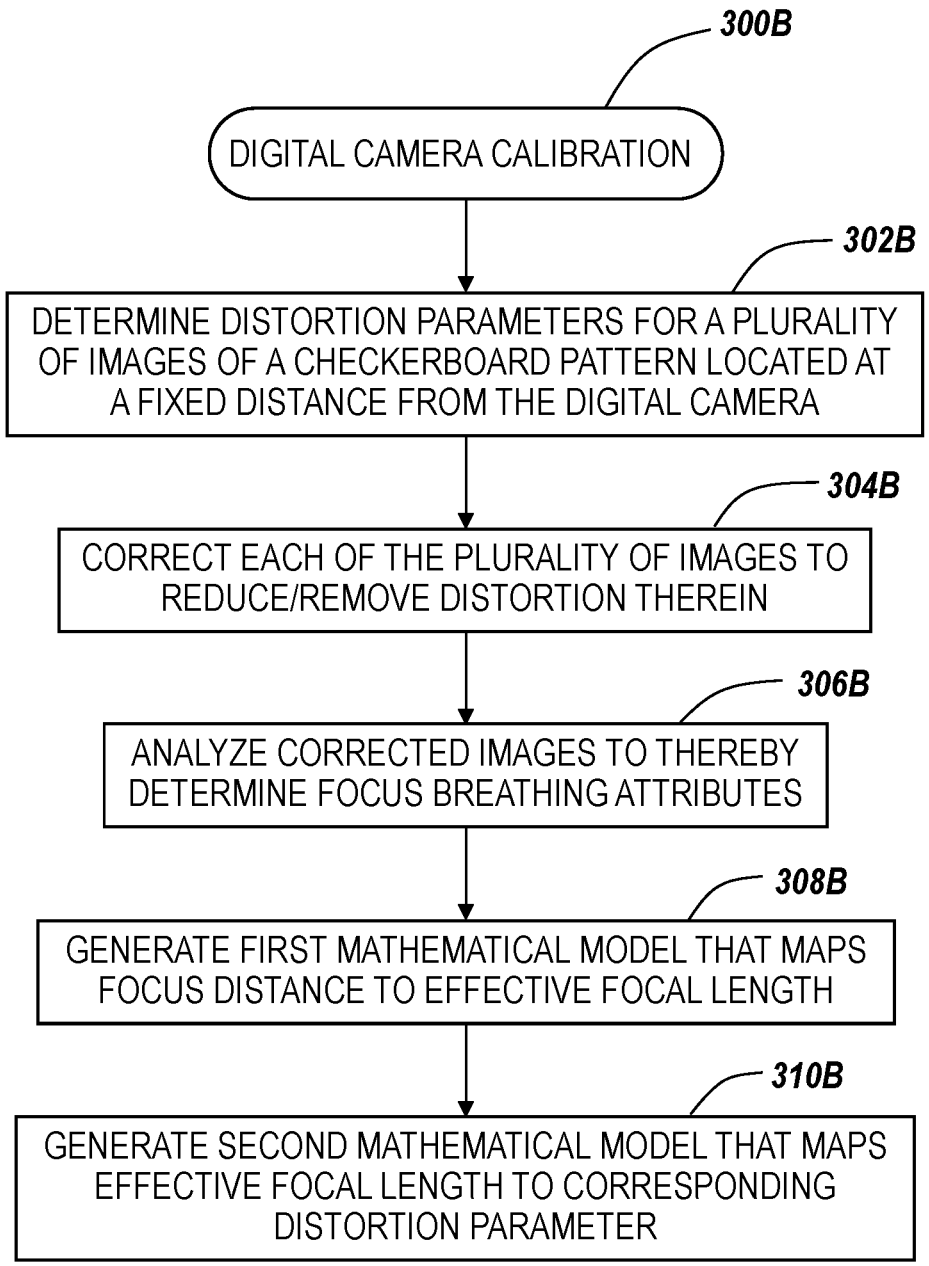
FIG. 3B is a flow diagram of operations that illustrates performing digital camera calibration to generate dynamic camera models, according to some embodiments of the invention.
Figure 3C:
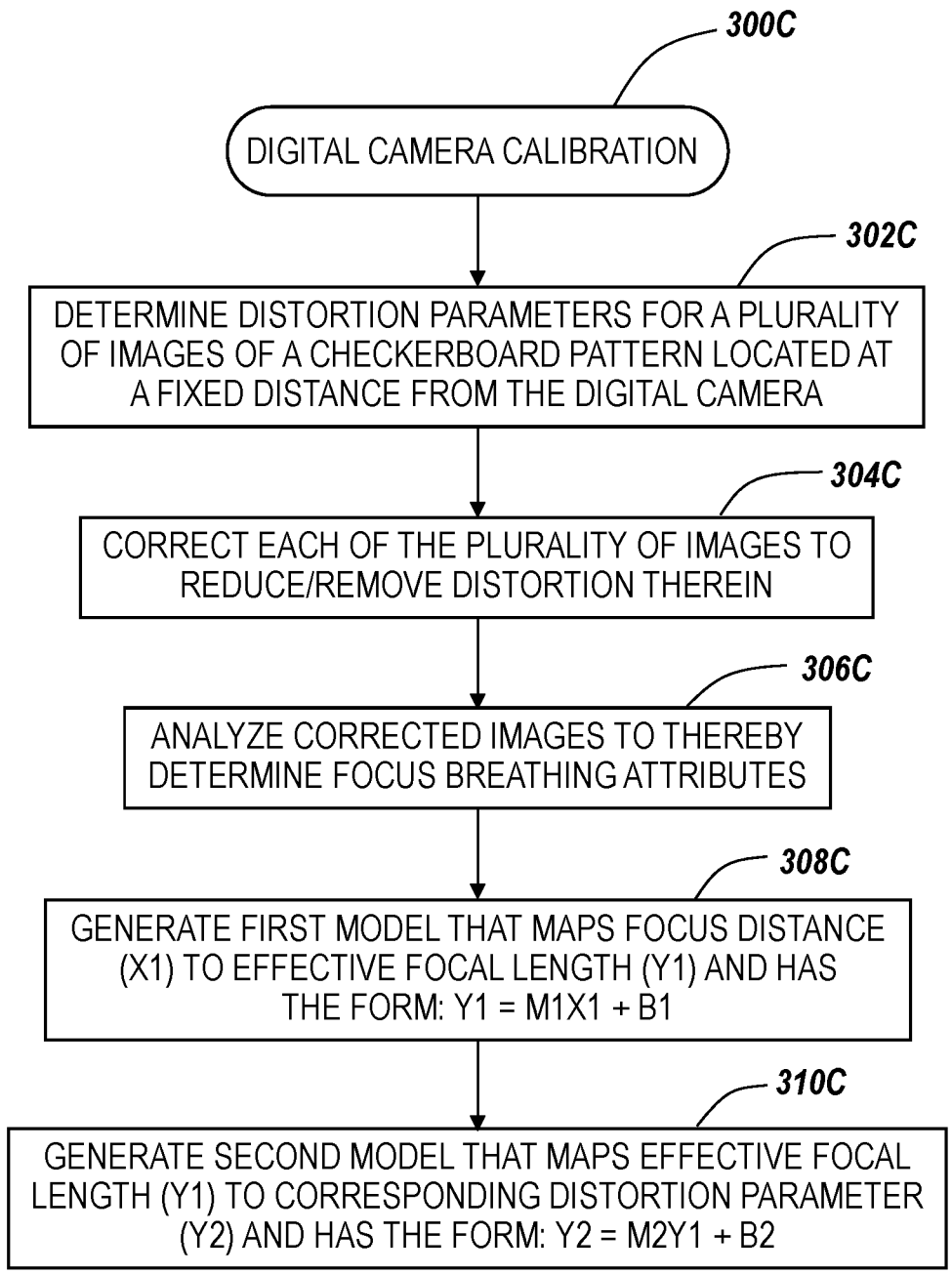
FIG. 3C is a flow diagram of operations that illustrates performing digital camera calibration to generate dynamic camera models, according to some embodiments of the invention.

In particular, camera calibration operations 300A-300C in accordance with the embodiments of FIGS. 3A-3C may follow a series of operations stemming from a plurality of image frames captured with unequal focus distance settings. These "calibration" image frames may be derived from a sequence of images of a predetermined 2D pattern (e.g., high density checkerboard pattern), which is located at a fixed distance from a camera undergoing calibration test. As shown by the calibration operations 300A of FIG. 3A, focus breathing attributes of the camera (see below) may be determined from the plurality of "calibration" image frames, Block 306A, and then used (with other parameters) to generate dynamic models, which map lens focus distance to one or more intrinsic characteristics of the camera, Block 308A.

More specifically, as shown by the calibration operations 300B of FIG. 3B, distortion parameters for each of a plurality of images of a checkerboard pattern are initially determined. Block 302B. As will be understood by those skilled in the art, these distortion parameters may be determined using a conventional and publicly available software library known as OpenCV, and the plurality of images of the checkerboard pattern will typically include an in-focus "reference" image, possibly based on conventional phase and contrast detection autofocusing operations, and a plurality of somewhat "out-of-focus" images taken across a range of focus distances, which need not necessarily span the entire focusing range (i.e., near and far) of the camera lens. Next, as shown by Block 304B, conventional operations may be used to undistort each of the image frames to thereby reduce distortion therein. These corrected image frames are then analyzed to determine focus breathing attributes (see below) within each image frame, across the range of focus distances, Block 306B. These focus breathing attributes are then used to support operations to determine a first mathematical model that maps focus distance to an effective focal length for the camera lens being calibrated, and at least a second mathematical model that maps effective focal length to a corresponding distortion parameter (or, maps focus distance directly to a corresponding distortion parameter), Blocks 308B, 310B. As described hereinabove, these operations may be used to support pose and position calculations in 3D scanning, as well as image generation in discrete image and video applications, for example.

Next, as shown by the calibration operations 300C of FIG. 3C, after distortion parameters for each of a plurality of images of a checkerboard pattern are initially determined and then each of the image frames is corrected ("undistorted") to thereby reduce distortion therein, Blocks 302C, 304C, the corrected image frames are analyzed to determine focus breathing attributes within each image frame, Block 306C. These focus breathing attributes are then used to support high speed and computationally efficient operations to: (i) determine a first mathematical model, which maps focus distance (X1) to an effective focal length (Y1) and has the linear form Y1=M1(X1)+B1, and (ii) determine a second mathematical model that maps effective focal length (Y1) to a corresponding distortion parameter (Y) and has the linear form Y2=M2(Y1)+B2, where M1 and M2 designate respective slopes of the linear relationships and B1 and B2 are constants, Blocks 308C, 310C. In some alternative embodiments of the invention, these first and second models may demonstrate one or more nonlinear relationships between focus distance, effective focal length and a distortion parameter.

Figure 4A:
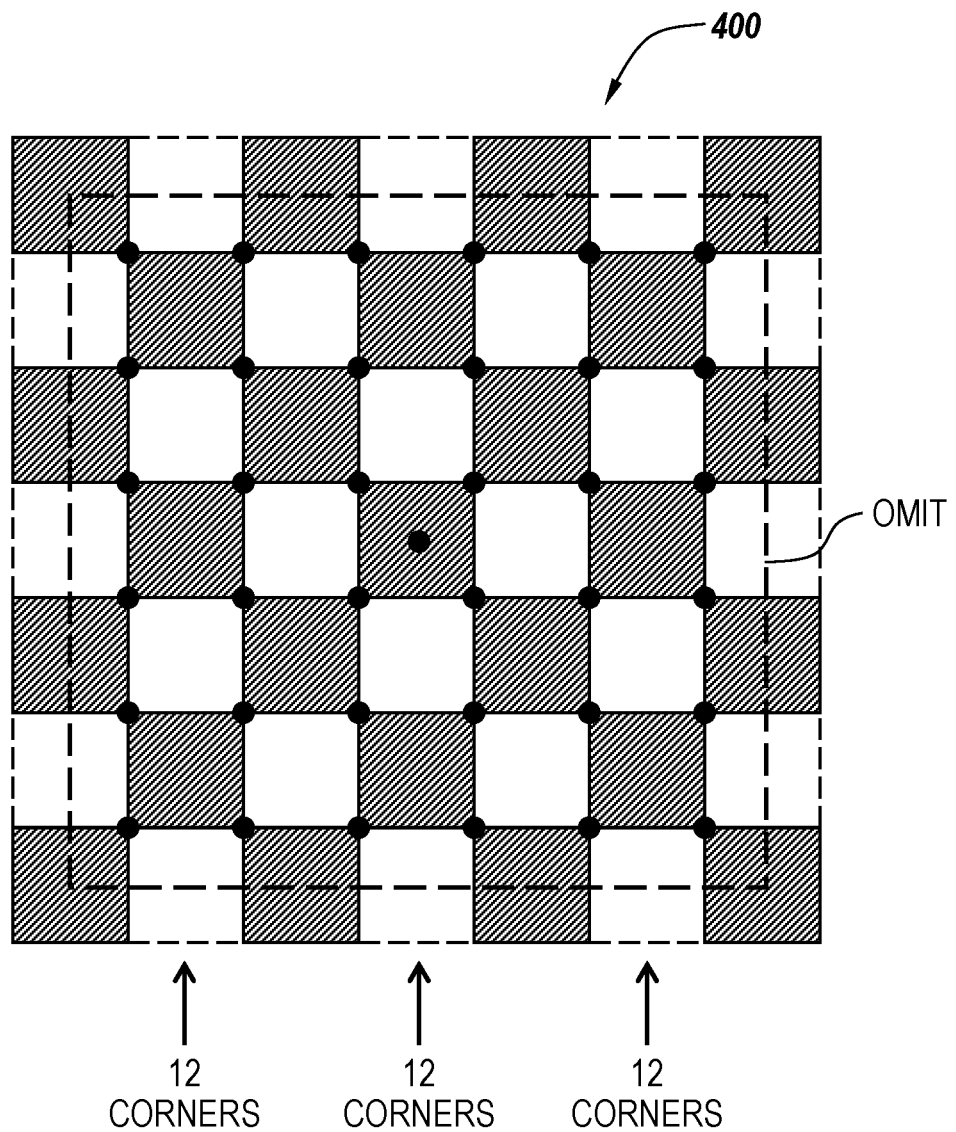
FIG. 4A is view of an example checkerboard pattern, which may be photographed at varying focus distances (and fixed actual distance) during operations to calibrate a digital camera, according to some embodiments of the invention.
Figure 4B:
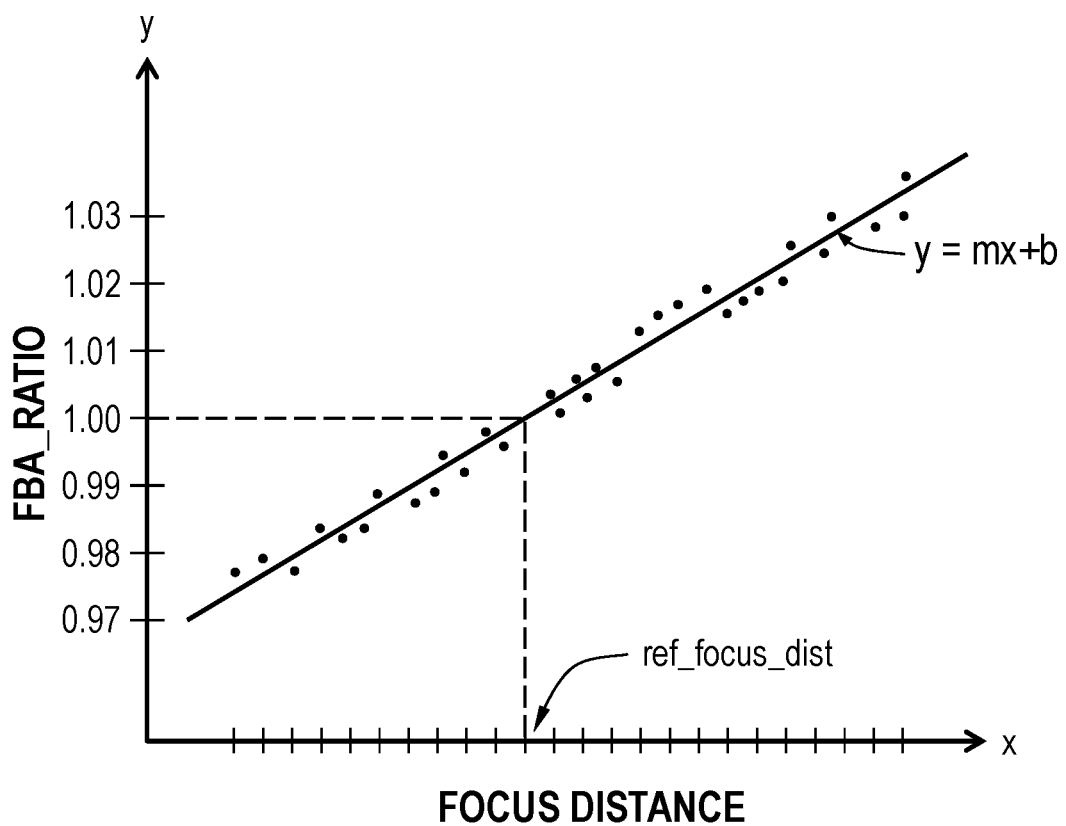
FIG. 4B is a graph that illustrates a relationship between a focus breathing attribute and focus distances, which may be used to calibrate a digital camera according to some embodiments of the invention.
Figure 4C:
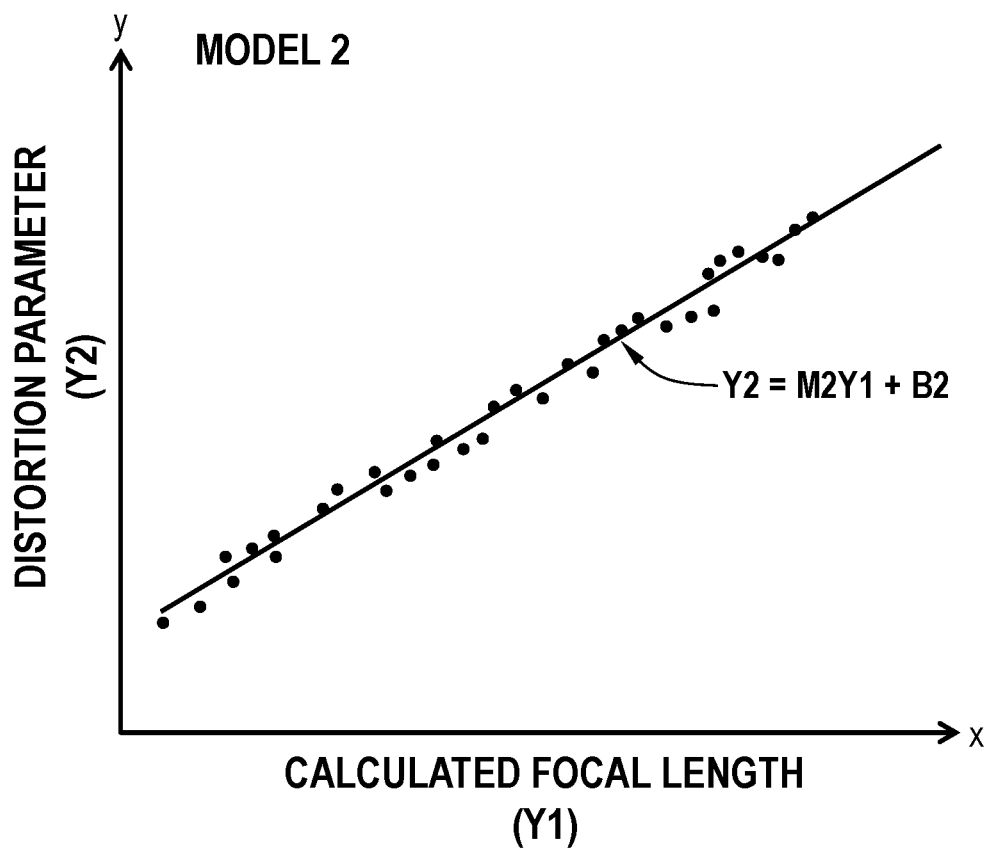
FIG. 4C is a graph that illustrates a relationship between a distortion parameter (e.g., radial distortion parameter) and a calculated focal length of a lens within a digital camera being calibrated, according to some embodiments of the invention.

Referring now to FIGS. 4A-4C, the above described operations for (i) calibrating a digital camera to determine dynamic models of intrinsic characteristics and (ii) operating the digital camera using the dynamic models, will now be more fully highlighted with an example that uses a "low density" checkerboard pattern as a 2D calibration image for purposes of illustration only. In this simplified example, a digital camera undergoing calibration may be mounted at a fixed distance relative to a 2D checkerboard pattern 400, which is shown by FIG. 4A, and aligned so that the image-plane of the camera's sensor is parallel to the surface of the pattern 400. As will be understood by those skilled in the art, the camera (see, e.g., FIG. 1B), which may be assumed to adhere closely to a pinhole camera model, should utilize an image sensor that is, with a relatively high degree of precision, properly aligned to its corresponding lens to thereby inhibit tangential distortion effects (a/k/al skewing distortion).

Preferably, the fixed distance should be chosen so that the pattern 400 almost fills an entire field of view of the camera. Nonetheless, to achieve sufficient margin, the outermost corners of the pattern 400 may be omitted from analysis, which leaves a centermost portion of the pattern 400 having 36 corners surrounding a principal point of the pattern 400 (from which distance measurements are made). For ease of understanding in this calibration example, the principal point of the pattern 400 is treated as the geometric center of the pattern 400. Because of the regularity and symmetry of the squares in the pattern 400, the calibration algorithms described hereinbelow can readily determine the locations of the corners, the sizing of the squares and the spacings between the corners, etc. using known techniques.

Next, without disturbing the camera, a potentially large number of images of the pattern 400 are captured at varying focus distances to thereby yield a corresponding number of "calibration" image frames of the pattern 400. The varying focus distances preferably span a full range of focus distances supported by the camera, to thereby yield one "in-focus" reference image frame, which was captured at focus_dist=ref_focus_dist, a plurality of image frames associated with "foreground" focus distances (i.e., focus_dist<ref_focus_dist) and a plurality of image frames associated with "background" focus distances (i.e., focus_dist>ref_focus_dist). As will be understood by one of ordinary skill in the art, the reference image frame need not necessarily be an "in-focus" frame.

Then, using conventional methods, such as those utilized in the publicly available software library known as OpenCV, distortion parameters may be determined for each of the "calibration" image frames, including a reference image frame associated with the reference focus distance (ref_focus_dist). As will be understood by those skilled in the art, in the case of radial distortion, which is a type of magnifying distortion that varies depending on a distance to the center "principal" point of the pattern 400, the magnitude of distortion can be approximated with a formula having many "k" multipliers. Distortion formulas with three (3) multipliers (k1, k2 and k3) may be sufficient for most applications, however additional multipliers (k4, k5, etc.) can be used to increase the precision of the approximation of the radial distortion for a pixel in an image frame.

Next, operations are performed to undistort the image frames to thereby reduce/cancel distortion therein. These "undistorting" operations may utilize conventional algorithms. For example, if it is known from the "k" multipliers identified above, that a pixel at a distance "r" from the principal point is magnified by 1.004, then undistorting it is simply a matter of moving it closer to the principal point by a factor of 1/1.004.

The focus breathing behavior of these distortion corrected images is then analyzed using software tools that: (i) find and mark all desired corners (e.g., 36 corners) over the pattern 400; (ii) match the corners between the calibration image frames; and (iii) plot the corners' movement across these image frames over the focus distance (which is different but known for each image frame). Next, for each of the 36 corners in an image frame, calculate a ratio between a corner's distance to the principal point of every image frame and the corresponding focus distance associated with the reference image frame (@ ref_focus_dist). And then, as shown by FIG. 4B, plot this ratio (as a focus breathing attribute (i.e., FBA_ratio), y-axis) over the range of focus distances (x-axis) associated with the calibration image frames. For ease of understanding herein, the resulting 36 ratios may be averaged to yield a single ratio per image frame. Next, operations are undertaken to perform a line fit of the ratio data (FBA_ratio) to acquire a formula (linear relationship) of the general form: y=mx+b, where "m" designates slope and "b" designates a constant (y-intercept). In some alternative embodiments of the invention, the plot of the ratio may be more accurately specified with a formula that specifies a nonlinear relationship.

In addition, using OpenCV and possibly other known techniques, a reference calibration is manually created at a static focus distance equal to "ref_focus_dist." This manual calibration is performed to deduce camera parameters using a set of "reference" images as input, and with focus_dist=ref_focus_dist for all reference images. These images are also of the checkerboard pattern 400, but are taken at different angles and at different distances from the pattern 400 to thereby yield a complete manual calibration (i.e., a set of values for: "reference" focal length, "reference" distortion parameters, etc.).

Next, the "reference" focal length determined from manual calibration is combined with the linear relationship of FIG. 4B to thereby yield a dynamic "focal length" model (as a function of focus distance), which is a first linear relationship of the form: $y_1=m_1x_1+b_1$, where $y_1$ designates the effective focal length, $x_1$ designates the focus distance, $m_1$ designates a slope of the linear relationship and $b_1$ is a first constant (y-intercept). This simple mapping of the linear relationship of FIG. 4B to the first linear relationship for effective focal length can be easily appreciated because a change in focal length is essentially a change in magnification. Thus, if a corner in the pattern 400 has moved from its position in the reference image frame, it has effectively been "magnified" and that magnification is the same as the relative change in lens focal length. This means that if the magnification from calibration frame "A" to the reference calibration frame is 1.0004, then the change in focal length is also 1.0004.

Finally, if the above-determined distortion parameters (e.g., radial distortion) for each of the calibration image frames are plotted (y-axis) as a function of a calculated focal length at a corresponding focus distance (x-axis), then a line fitting operation may be simply performed to acquire a dynamic "distortion" model as a second linear relationship of the form: $y_2=m_2y_1+b_2$, where $y_2$ designates the distortion parameter, $y_r$ designates the effective focal length (determined from the first linear relationship), $m_2$ designates a slope of the second linear relationship and $b_2$ is a second constant (y-intercept). Alternatively, this "distortion" model may specify a somewhat more complex nonlinear relationship, in some additional embodiments of the invention.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of operating a digital camera, comprising:
   generating a plurality of image frames of an object at respective focus distances relative to the digital camera; and
   determining for each of the plurality of image frames and within the digital camera, at least one intrinsic characteristic of the digital camera using a model of the digital camera that maps the focus distance of the corresponding image frame to the at least one intrinsic characteristic; and
   wherein the model of the digital camera is stored in memory within the digital camera so that said determining can be performed in real time as the plurality of image frames are generated;
   wherein the model comprises a first model that maps focus distances associated with the plurality of image frames to effective focal lengths of the digital camera, and a second model that maps the effective focal lengths to the at least one intrinsic characteristic;

wherein the first model is in the form of a first linear relationship as: $y_1=m_1x_1+b_1$, where $y_1$ designates the effective focal length, $x_1$ designates the focus distance, $m_1$ designates a slope of the first linear relationship and $b_1$ is a first constant; and wherein the second model is in the form of a second linear relationship as: $y_2=m_2y_1$ $b_2$ where $y_2$ designates the distortion parameter, $v_1$ designates the effective focal length, $m_2$ designates a slope of the second linear relationship and $b_2$ is a second constant.

2. The method of claim 1, wherein the effective focal lengths determined for the plurality of image frames are unequal.

3. The method of claim 1, wherein the digital camera comprises a lens having a nominal focal length; wherein the effective focal lengths determined for at least some of the plurality of image frames are unequal to the nominal focal length; and wherein at least one of the first and second models is a linear model.

4. The method of claim 1, wherein each of the plurality of image frames is generated when a fixed or zoom lens within the digital camera is set to a nominal focal length; and wherein the effective focal lengths determined for at least some of the plurality of image frames are unequal to the nominal focal length.

5. The method of claim 1, wherein the at least one intrinsic characteristic is selected from a group consisting of a radial distortion parameter, a tangential/skewing distortion parameter and a principal point parameter.

6. An image processing device, comprising:
a microprocessor; and
a memory having image processing program code therein that is readable by the microprocessor and executable therein, said image processing program code comprising microprocessor-readable program code configured to cause the image processing device to:
generate a plurality of image frames of an object at respective focus distances relative to the image processing device; and
determine, for each of the plurality of image frames, at least one intrinsic characteristic of the image processing device using a model of the image processing device that maps the focus distance of the corresponding image frame to the at least one intrinsic characteristic, said model comprising a first model that maps focus distances associated with the plurality of image frames to effective focal lengths of the digital camera, and a second model that maps the effective focal lengths to the at least one intrinsic characteristic;
wherein the first model is in the form of a first linear relationship as: $y_1=m_1$ $x_1+$where $v_1$ designates the effective focal length, $x_1$ designates the focus distance, $m_1$ designates a slope of the first linear relationship and $b_1$ is a first constant; and
wherein the second model is in the form of a second linear relationship as: $y_2=m_2y_1+b_2$, where $y_2$ designates the distortion parameter, $y_1$ designates the effective focal length, $m_2$ designates a slope of the second linear relationship and $b_2$ is a second constant.

7. The device of claim 6, wherein each of the plurality of image frames is generated when a lens within the image processing device is set to a nominal focal length; and wherein the effective focal lengths determined for at least some of the plurality of image frames are unequal to the nominal focal length.

8. The device of claim 6, wherein the at least one intrinsic characteristic is selected from a group consisting of a radial distortion parameter, a tangential distortion parameter and a principal point parameter; and wherein at least one of the first and second models is a linear model.

9. A handheld cellular device, comprising:
a body having a digital camera therein with a fixed or variable focal length lens, an image sensor optically coupled to the lens, a microprocessor and at least one memory having image processing program code therein that is readable by the microprocessor and executable therein, said microprocessor and said image processing program code collectively configured to:
generate a plurality of image frames of an object at respective focus distances relative to the handheld cellular device; and
determine, for each of the plurality of image frames, at least one intrinsic characteristic of the digital camera using a model of the digital camera that maps the focus distance of the corresponding image frame to the at least one intrinsic characteristic, said model comprising a first model that maps focus distances associated with the plurality of image frames to effective focal lengths of the digital camera, and a second model that maps the effective focal lengths to the at least one intrinsic characteristic;
wherein the first model is in the form of a first linear relationship as: $v_1=m_1$ $x_1+b_1$, where $y_1$ designates the effective focal length, $x_1$ designates the focus distance, $m_1$ designates a slope of the first linear relationship and $b_1$ is a first constant; and
wherein the second model is in the form of a second linear relationship as: $y_2=m_2y_1$ $b_2$ where $y_2$ designates the distortion parameter, $v_1$ designates the effective focal length, $m_2$ designates a slope of the second linear relationship and $b_2$ is a second constant.

10. The device of claim 9, wherein each of the plurality of image frames is generated when the lens is set to a nominal focal length; and wherein the effective focal lengths determined for at least some of the plurality of image frames are unequal to the nominal focal length.

11. The device of claim 9, wherein the model of the digital camera is stored in memory within the handheld cellular device so that operations to determine the at least one intrinsic characteristic can be performed in real time as the plurality of image frames are generated; and wherein at least one of the first and second models is a linear model.

* * * * *

UNITED STATES PATENT AND TRADEMARK OFFICE
CERTIFICATE OF CORRECTION

PATENT NO. : 11,151,746 B2
APPLICATION NO. : 16/630632
DATED : October 19, 2021
INVENTOR(S) : Walls et al.

Page 1 of 1

It is certified that error appears in the above-identified patent and that said Letters Patent is hereby corrected as shown below:

On the Title Page

Item (57) Abstract, Line 10:
Please correct "3 image scanning." to read -- 3D image scanning. --

In the Claims

Column 11, Line 7, Claim 1:
Please correct "$y_2=m_2y_1\ b_2$ where" to read -- $y_2=m_2y_1+b_2$, where --

Column 11, Line 8, Claim 1:
Please correct "$v_1$" to read -- $y_1$ --

Column 11, Line 52, Claim 6:
Please correct "$y_1=m_1\ x_1+$where $v_1$" to read -- $y_1=m_1x_1+b_1$, where $y_1$ --

Column 12, Line 37, Claim 9:
Please correct "$v_1=m_1\ x_1+b_1$" to read -- $y_1=m_1x_1+b_1$ --

Column 12, Line 42, Claim 9:
Please correct "$y_2=m_2y_1\ b_2$ where" to read -- $y_2=m_2y_1+b_2$, where --

Column 12, Line 43, Claim 9:
Please correct "$v_1$" to read -- $y_1$ --

Signed and Sealed this
Sixteenth Day of August, 2022

*Katherine Kelly Vidal*
Katherine Kelly Vidal
*Director of the United States Patent and Trademark Office*